T. A. BARRETT.
CUT-OFF VALVE FOR GAS JETS.
APPLICATION FILED SEPT. 15, 1909.
981,606.
Patented Jan. 17, 1911.
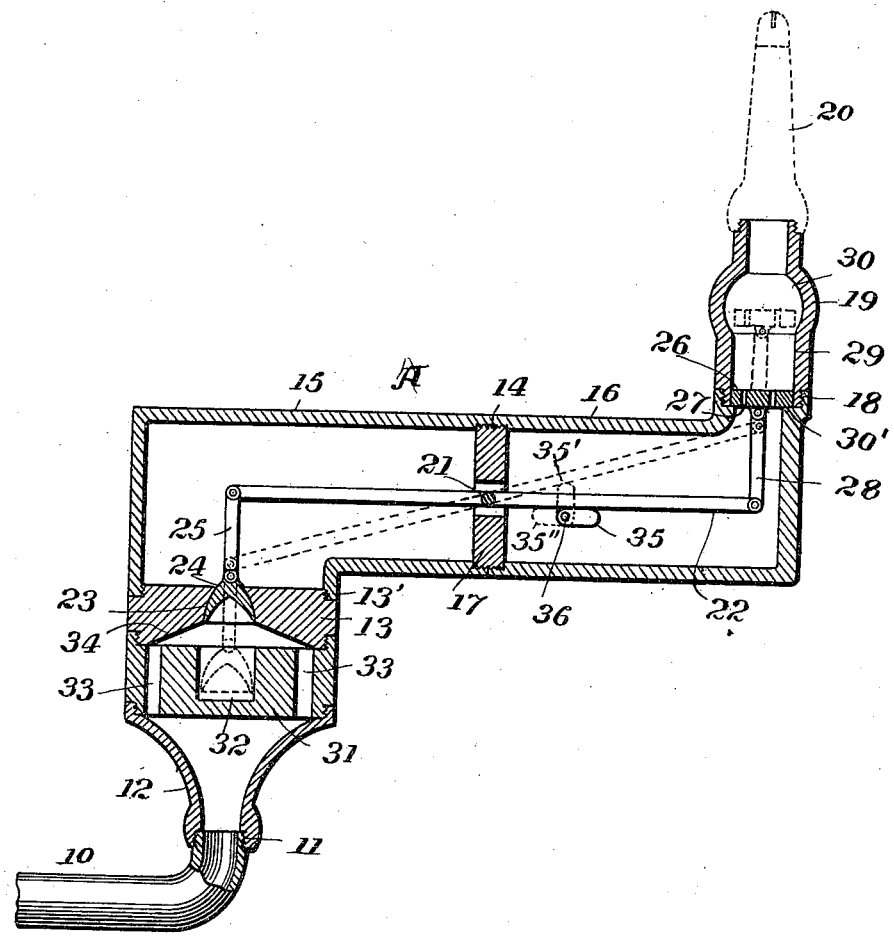
Witnesses
Inventor
Thomas A. Barrett
By
Foster, Freeman, Watson & Coit
Attorneys

UNITED STATES PATENT OFFICE.

THOMAS A. BARRETT, OF WILKES-BARRE, PENNSYLVANIA, ASSIGNOR OF TWENTY-FOUR ONE-HUNDREDTHS TO CHARLES A. McDADE AND TWENTY-FIVE ONE-HUNDREDTHS TO HENRY L. WERMINGHAUS, BOTH OF WILKES-BARRE, PENNSYLVANIA.

CUT-OFF VALVE FOR GAS-JETS.

981,606.  Specification of Letters Patent.  Patented Jan. 17, 1911.

Application filed September 15, 1909. Serial No. 517,899.

*To all whom it may concern:*

Be it known that I, THOMAS A. BARRETT, a citizen of the United States, and resident of Wilkes-Barre, Luzerne county, State of Pennsylvania, have invented certain new and useful Improvements in Cut-Off Valves for Gas-Jets, of which the following is a specification.

This invention relates to cut-off valves for gas jets.

It is customary to supply a consumer with a prepaid meter in which a coin is inserted which opens the supply valve and supplies the consumer with a predetermined amount of gas. Where such a system is used it often happens that the gas is turned off after the predetermined amount has been consumed and if another coin is inserted so as to again open the valve, the lights having been extinguished, the gas escapes in the room and is liable to cause explosions and even death to the occupants of the room by asphyxiation.

The object of this invention therefore is to provide a cut-off valve which will close when the supply of gas is interrupted and will thereafter remain closed until again manually operated. The cut-off valve and its connections are so arranged and housed that they may be connected to any gas bracket of ordinary construction.

In the drawings, the figure shows a longitudinal section through part of the gas bracket and the cut-off valve and its casing.

Referring to the drawings, 10 designates a portion of an ordinary gas bracket provided with the usual threaded portion 11. A casing A is provided with an attaching portion or base 12 which is tapped so as to be screwed on the threaded end 11 of the bracket 10. A section 13 is secured to an off-set section 13' of the casing A by means of a threaded connection as shown. Casing A is composed of sections 15 and 16 which are joined at 14 by being screwed on to a circular block 17. The section 16 is provided with an off-set portion 18 into which is screwed a section 19 which has a thread adapted for connection with the usual burner 20. The casing and its attached portions are of hollow construction so as to provide a gas passage.

Mounted upon a pivot pin 21 in the block 17 is a two-armed lever 22. The section 13 is provided with a tapered seat 23 to provide a seat for the valve 24. A link 25 pivotally connects the valve 24 with one arm of the lever 22. A piston 26 provided with a number of small perforations 27 is pivotally connected to the other arm of the lever 22 by means of the link 28. The piston slides on the inside surface 29 of the section 19. The portion 29 is of substantially the same diameter as the piston but is enlarged, as shown at 30 to a greater diameter than the piston. The off-set portion 18 is provided with a shoulder 30' which forms a stop against which the piston 26 abuts.

A block 31 is secured to the section 12 and provided with a recess 32 adapted to receive the cut-off valve 24, and a number of gas passages 33 which surround the recess 32 so that the valve when in dotted line position will be out of the path of flow of the gas. Block 31 may be integral with 12. The section 13 is provided with an upwardly inclined surface 34 and the upper surface of the valve is conical in form for a purpose hereinafter to be described.

A cam lug 35 is mounted upon a shaft 36 in the section 16 of the casing A. This shaft has mounted upon it outside of the casing a button or finger piece, not shown. By turning the shaft 36 by means of the button or finger piece, the lever 22 may be moved from full line to dotted line position, the position of the cam lug being shown at 35'. The casing is provided with stops whereby the cam lug will be arrested in its two extreme positions 35 and 35''.

When the gas is turned off the parts will be in full line position. In this position it will be noted that the valve 24 is seated and thus the supply of gas will be effectually cut off. After the gas has been turned on by the usual cock, the cam lug 35 is moved to dotted line position 35' so as to move the parts to dotted line position. In this position the flow of gas will take place through the passages 33, the aperture formed in the section 13 by the valve seat, the hollow casing A and through the apertures 27 and around the piston 26 to the burner. The flow of gas against the piston 26 will keep it in raised position and therefore the cam lug 35 may be moved to the position 35''. The piston 26 forms a throttling member for the gas passage, allowing the gas to flow past it, but the impinging gas will keep it in raised position. Since the valve 24 is located in the recess 32, it will be out of the path of the flow of the gas, and due to the fact that the upper surface of the valve is conical in form, the gas will have more of a tendency to depress the valve than to raise it, this action being aided by the inclined surfaces 34, by means of which the gas is partially deflected against the upper surface of the valve and thus tends to keep it in its lower open position.

If, for any reason, the flow of gas is interrupted, as when the prepayment meter cuts off the supply of gas, the weighted piston 26, which is heavier than the valve 24, moves to the full line position and closes the valve. When the gas is hereafter turned on again as by inserting another coin, the valve 24 will remain closed and it can not thereafter be opened by the flow of gas until manually opened by means of the cam lug 35.

It is obvious that various changes may be made in the details of construction without departing from this invention, and it is therefore to be understood that this invention is not to be limited to the specific construction shown and described.

Having described my invention what I claim and desire to secure by Letters-Patent is, 1. In a device of the class described, in combination, a casing having angular offset portions, one for connection with the gas supply pipe and the other with a burner, a gas passage in the casing and its portions, a cut-off valve in the passage in the first portion, and a member connected with the valve, located in the passage in the second portion, operated by the flow of gas through said portion, and constructed to maintain said valve open when the gas is turned on and to close the same when the flow of gas is interrupted.

2. In a device of the class described, in combination, a casing having portions, one for connection with the gas supply pipe and another with a burner, a gas passage in the casing and its portions, a cut-off valve in the passage in the first portion, and a throttling member located in said passage so as to be impinged upon by the gas and movable in the direction of the flow of gas in said passage, said member being connected to said valve and constructed to maintain said valve open when the gas is turned on, and to close the same when the flow of gas is interrupted.

3. In a device of the class described, in combination, a casing having portions, one for connection with a gas supply pipe and the other with a burner, a gas passage in the casing and its portions, a cut-off valve in the gas passage, and a piston in the passage in the second portion and operated by the gas, said piston being connected with the valve and constructed to permit gas to flow past it and to maintain said valve open when the gas is turned on and to close the same when the flow of gas is interrupted.

4. In a device of the class described, in combination, a casing having portions, one for connection with a gas supply pipe and the other with a burner, a gas passage in the casing and its portions, a cut-off valve in the gas passage, and a perforated piston in the passage in the second portion, said piston being connected with the valve and constructed to maintain it open when the gas is turned on and to close the same when the flow of gas is interrupted.

5. In a device of the class described, in combination, a casing having portions, one for connection with the gas supply pipe and the other with a burner, a gas passage in the casing and its portions, a cut-off valve in the gas passage, and a piston guided in the passage in the second portion, said piston being connected with the valve and constructed to maintain said valve open when the gas is turned on and to close the same when the flow of gas is interrupted, the upper part of said passage being enlarged to a larger diameter than the piston to permit gas to flow between the piston and passage wall when the valve is in open position.

6. In a device of the class described, in combination, a casing having portions, one for connection with the gas supply pipe and the other with a burner, a gas passage in the casing and its portions, a cut-off valve in the passage in the first portion, a weighted piston in the passage in the second portion, a lever pivoted in the casing and connecting the valve and piston, and means for operating the lever, said piston being operated by the gas and constructed to permit gas to flow past it.

7. In a device of the class described, in combination, a casing provided with a gas passage, a cut-off valve in the passage, means in the passage having a cavity to receive the cut-off valve when open so as to position it out of the path of flow of the gas, and means constructed to maintain the valve open when the gas is turned on and to close the same when the flow of gas is interrupted.

8. In a device of the class described, in combination, a casing provided with a gas passage, a cut-off valve in the passage, means in the passage having a cavity to receive the cut-off valve when open so as to position it out of the path of flow of the gas, and means constructed to maintain the valve open when the gas is turned on and to close the same when the flow of gas is interrupted, the upper surface of the valve being conical in form.

9. In a device of the class described, in combination, a casing provided with a gas passage, a cut-off valve in the passage, a block in the passage provided with a cavity to receive the valve when open, gas passages through the block around the cavity, whereby the gas is deflected away from the valve, and means constructed to maintain the valve open when the gas is turned on and to close the same when the flow of gas is interrupted, the upper surface of the valve being conical in form.

10. In a device of the class described, in combination, a casing provided with a gas passage, a cut-off valve in the passage, means to position said cut-off valve out of the path of flow of the gas, and means constructed to maintain the valve open when the gas is turned on and to close the same when the flow of gas is interrupted.

In testimony whereof I affix my signature in presence of two witnesses.

THOMAS A. BARRETT.

Witnesses:
 JOHN M. PARRY,
 J. R. BAER.